Feb. 5, 1957 G. C. CHERNISH 2,780,736
POWER SUPPLY
Filed May 3, 1955
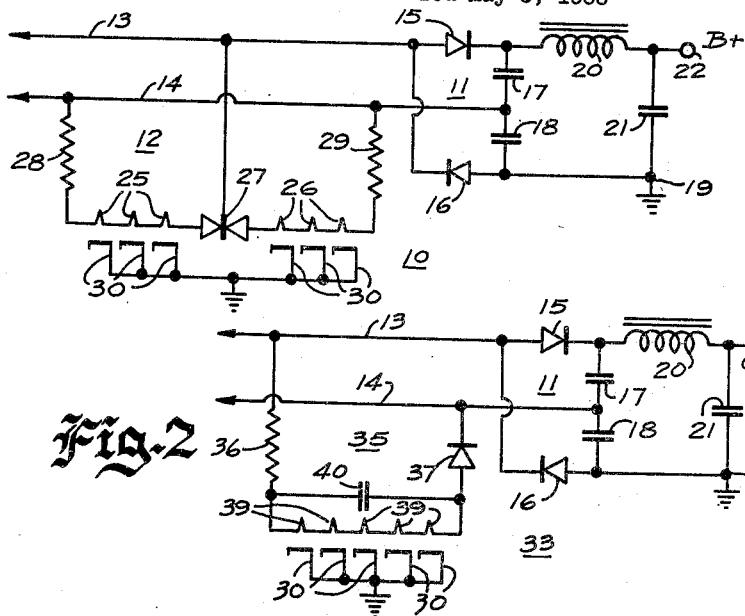
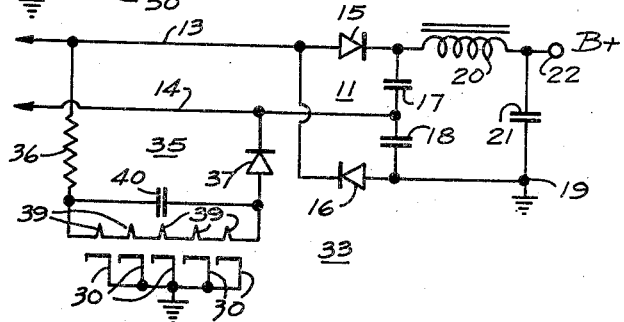
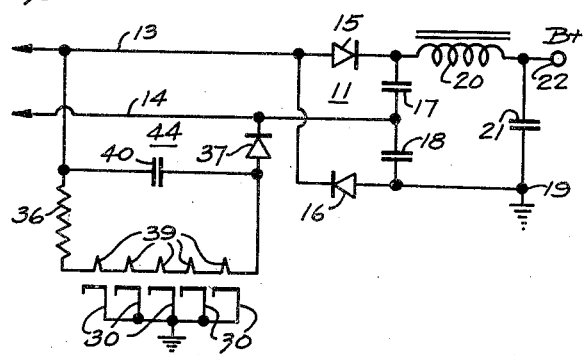
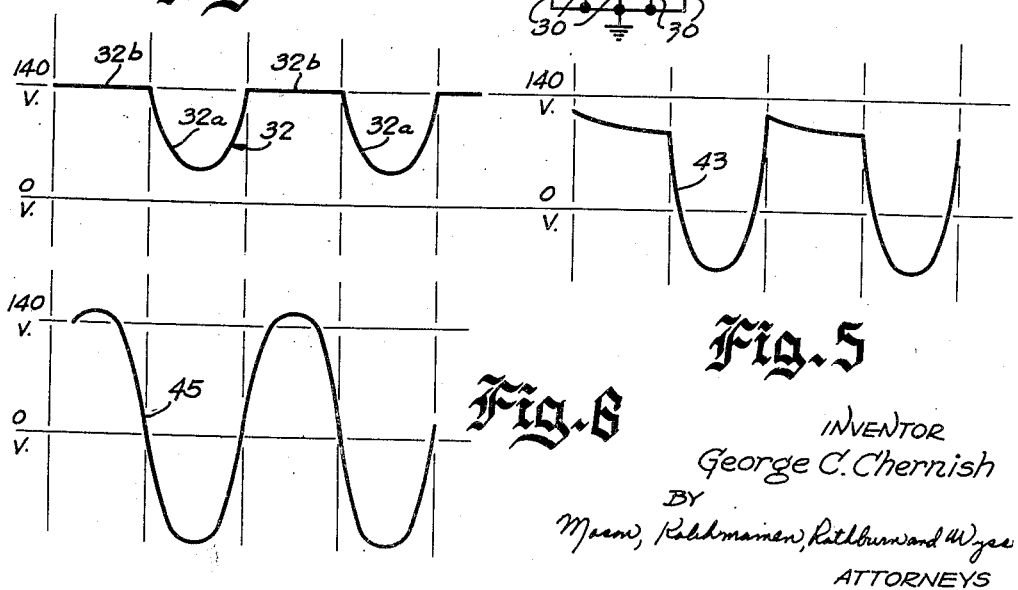
INVENTOR
George C. Chernish
BY
Mason, Kolehmainen, Rathburn and Wyss
ATTORNEYS

United States Patent Office 2,780,736
Patented Feb. 5, 1957

2,780,736

POWER SUPPLY

George C. Chernish, Niagara Falls, Ontario, Canada, assignor to Sylvania Electric Products Inc., a corporation of Massachusetts Application May 3, 1955, Serial No. 505,804

7 Claims. (Cl. 307—150)

The present invention generally relates to power supplies, more particularly to D. C. power supplies for use in radio and television receivers, and the invention has for an object the provision of a new and improved power supply which incorporates a voltage multiplier and tube heater circuit in such a manner that the rated cathode-to-heater potential of the tubes commonly used in radio and television receivers is not exceeded.

Since many receiving tubes of the type generally used in radio and television receivers are designed to operate efficiently with an anode voltage of between 250 and 300 volts D. C., in order to operate such receivers from the ordinary A. C. power line, which provides a voltage of 117 volts A. C., it is necessary in some way to increase the magnitude of the line voltage and to rectify it so as to provide the required 250 to 300 volts D. C. The early A. C. operated receivers employed a power supply which included a transformer for stepping up the A. C. voltage to a relatively high value and a rectifier for polarizing the high A. C. voltage so developed to thereby provide a relatively high D. C. voltage for energizing the anodes of the tubes provided in the receiver. Because of the relatively high cost of such transformers and because of undesirable electromagnetic radiation therefrom, it was desired to provide a power supply which while producing the required D. C. anode voltage did not require the use of a transformer.

It was found that voltage multiplier circuits incorporating a plurality of dry disc rectifier could be employed to rectify and step up the line voltage and could be manufactured at a cost considerably reduced from that required to produce the transformer type power supply. The elimination of the transformer necessitated the connection in series of the heaters of the tubes employed in these receivers so that no one of the tube heaters was provided with an amount of current which exceeded the rating thereof. Power supplies of this type were incorporated in competitive type radio and television receivers and sold for a number of years. It was found during that time, however, that television receivers and radio receivers employing the transformerless type power supplies with full-wave voltage doublers developed considerably more tube failures than those employing the transformer type power supplies, and it was finally discovered that the tube failures were primarily caused by the excessive voltage which was developed between the cathodes and the heaters of the tubes. Since no satisfactory means could be found to eliminate this high voltage, the full-wave voltage doubler and series connected heater type power supplies were eliminated from competitive equipment and the expensive, old type transformer power supply was reintroduced into radio and television receivers with the resulting increased manufacturing cost and retail price.

Therefore, another object of the present invention is the provision of a new and improved heater circuit.

Still another object of the present invention is to provide a new and improved full-wave voltage doubler and series heater circuit in which the cathode-to-heater voltage is considerably less than the tube manufacturer's rating.

A further object of the invention is to provide a new and improved power supply which is simple, inexpensive and more reliable than prior art power supplies of the type suitable for use in radio and television receivers.

A still further object of the present invention is to provide a power supply which develops the required D. C. anode potential and provides the required heating voltage for the tube heaters without developing a cathode-to-heater voltage in excess of the rated value for the type tubes commonly used in radio and television receivers.

Briefly, the above objects are realized in accordance with the present invention by the provision of a full-wave voltage doubler circuit incorporating a pair of rectifiers and a pair of capacitors adapted to be connected across an A. C. supply line to produce a direct potential having a magnitude sufficient to energize the anode-cathode circuits of radio and television receivers. In addition, a line of tube heaters is serially connected with a dropping resistor on one end and a rectifier on the other end across the A. C. supply line, whereby, the heaters are supplied with the required heating current, the necessary B+ direct voltage is developed and the cathode-to-heater voltage rating of the tubes is not exceeded. In order to enable, in television receivers, the use of a single line of filament heaters and a single rectifier while providing the required heating current, in accordance with another aspect of the present invention a capacitor is connected in the filament heating circuit so that on alternate half cycles of the A. C. source the capacitor is charged and during the intermediate half cycles the capacitor discharges through the heaters, thereby to maintain the effective current in the filaments at the required value.

In accordance with a still further aspect of the invention, a circuit is provided whereby the capacitor is eliminated and the heaters are arranged across the power line in two series-connected strings, thereby to effect a power supply which is relatively simple, and consequently, inexpensive and yet operates in a reliable manner.

For further objects and advantages of the present invention, attention is now directed to the following description and drawings in which:

Figs. 1, 2 and 3 are schematic electric diagrams of different embodiments of the present invention; and Figs. 4, 5 and 6 are waveforms useful in understanding the operation of the circuits of Figs. 1, 2 and 3.

Before considering the details of the present invention as illustrated in the drawings, it should be pointed out that although the maximum cathode-to-heater voltage rating of receiving type tubes is generally listed at either 90 or 110 volts D. C., with the heaters positive with respect to cathode, if the sum of the D. C. and A. C. voltages provided between the cathodes and associated heaters exceeds 200 volts, the life of a tube so operated is greatly reduced. In the design of power supply circuits, it thus becomes necessary not only to consider the unidirectional voltage which appears between the cathodes and the heaters but also to consider the alternating voltage which is developed therebetween and to design the circuit so as at all times to maintain the sum of the A. C. and D. C. voltages at less than 200 volts.

Referring now to the drawings and more particularly to Fig. 1, there is shown a power supply 10 consisting of a voltage doubler circuit 11 and a heater circuit 12, both of which are adapted to be energized through a pair of conductors 13 and 14 from a conventional 117 volt, 60 cycle power line. Since the heater circuit 12 is particularly suitable for application in electronic equipment of the type employing a relatively large number of tubes such, for example, as of the order of fifteen or more, the invention finds particular application in television receivers.

In order to provide a D. C. voltage of sufficient magnitude to energize the anode-to-cathode circuits of the tubes used in a television receiver employing the power supply 10, the voltage doubler circuit 11 includes a pair of unidirectional impedance devices or rectifiers 15 and 16 serially connected across a pair of charging capacitors 17 and 18, thereby to provide full-wave rectification of the A. C. voltage appearing between the lines 13 and 14 so as to develop a D. C. voltage of approximately twice the peak line voltage across the series circuit consisting of the capacitors 17 and 18. Since the junction between the capacitor 18 and the device 16 is connected to ground at 19, a D. C. potential of approximately twice the peak value of the line voltage appears at the junction of the capacitor 17 and the rectifier 15. In order to filter out any ripple which might appear in the direct voltage developed across the capacitors 17 and 18, a choke coil 20 and a capacitor 21 are connected between the positive side of the capacitor 17 and the ground point 19. In a reduction to practice of the invention when an A. C. voltage of 117 volts was supplied across the conductors 13 and 14, the voltage doubler circuit 11 developed a unidirectional voltage of approximately 270 volts with normal current drawn from the supply 10 at the terminal 22.

In order to supply sufficient current to all of the tube heater filaments in a television receiver without employing an isolation transformer, the heaters may be arranged in two series-connected strings, 25 and 26, each string being arranged to be energized from across the same source of A. C. voltage. Although in certain types of equipment employing a relatively small number of tubes, a single string of filaments may be used, where fifteen or more tubes must be heated from a 117 volt source, a number of strings, connected in parallel should be utilized so as to provide sufficient heating current for each heater. In order to energize each of these series strings of heaters from the same A. C. source which energizes the voltage doubler circuit 11 without exceeding the rated cathode-to-heater voltage of the tubes, the heater strings 25 and 26 are each serially connected with one-half of a double back-to-back type rectifier 26 and the respective dropping resistors 28 and 29 between the conductors 13 and 14 so as to provide two identical heater supply circuits connected in parallel across the supply line. Consequently, half-wave rectification of the A. C. voltage supplied across the lines 13 and 14 is effected, and current flows in the strings 25 and 26 during alternate half cycles of the A. C. source. As heretofore mentioned, when a relatively small number of tubes are involved, whereby only a small number of heaters need be connected across the supply lines 13 and 14, all of the filaments may be connected in a single line and in such case only a single rectifier and a single dropping resistor need be employed.

Each of the heater filaments in the strings 25 and 26 has associated therewith a cathode 30 which is either connected directly to ground or through an impedance to ground such that the minimum potential which is supplied to any of the cathodes is zero volts or ground potential. For purposes of illustrating the present invention, the most troublesome condition, namely, the condition when the cathodes 30 are connected directly to ground, is assumed and shown in the drawing. During normal operation of the power supply 10 wherein the conductors 13 and 14 are connected across a source of 117 volt A. C. energy, a unidirectional voltage of approximately 140 volts is developed across the capacitor 18 because of the half-wave rectification effected by the rectifier 16, and, therefore, the conductors 13 and 14 ride at a static D. C. potential of approximately 140 volts above ground. It may be seen then that if the heater strings 25 and 26 even though connected in circuit with the rectifier 27 were directly connected to the conductor 14 rather than through the dropping resistors 28 and 29, one heater in each of the lines 25 and 26 would be operating at 140 volts D. C. with respect to its associated cathode. Therefore, the D. C. cathode-to-heater voltage rating of that particular tube would be exceeded by 40 or 50 volts depending upon the particular type tube used. Of course, the rated cathode-to-heater voltage of at least some of the other tubes in the string would also be exceeded. Furthermore, if the rectifier 27 were not provided, during a portion of each cycle of the alternating voltage source the alternating voltage provided across the lines 13 and 14 is superimposed upon the 140 volts D. C. developed across the capacitor 18 which would result in a total cathode-to-heater voltage which is more than three times the rated voltage of the tubes. Since it was not uncommon serially to connect the heater filaments directly across the supply line in earlier television receivers, it was this high voltage which was developed between the cathodes and the respective heaters that resulted in the excessively high number of tube failures and finally resulted in the elimination of the voltage doubler type power supply from commercial receivers and the reintroduction therein of the more expensive transformer type power supply.

An understanding of the theory of operation of the heater supply circuit 12 may best be had by reference to Fig. 4 wherein the curve 32 represents the waveform of the voltages which appear between the junction point of the dropping resistor 28 and the tube heaters with respect to ground and between the junction point of the resistor 29 and the tube heaters with respect to ground when the lines 13 and 14 are connected across a 117 volt source of alternating voltage. During that portion of the cycle of the alternating voltage source when the conductor 14 is positive with respect to the conductor 13, current flows between the conductors 14 and 13 to the heater strings 25 and 26 through the dropping resistors 28 and 29 and thence from the heaters in the strings 25 and 26 through the rectifier 27 back to the conductor 13. This current results in a sufficiently high voltage drop across each of the dropping resistors 28 and 29 so that the cathode-to-heater voltage is reduced to about forty volts during part of each cycle. During the negative half-cycle, because of the rectification characterisic of the device 27, no current flows in either half of the heater supply circuit 12, and, consequently, no voltage drop occurs either of the dropping resistors 28 and 29. During the negative half-cycle, therefore, the heaters 25 and 26 remain at the operating level (140 volts) established on the conductors 13 and 14 by the voltage developed across the capacitor 18.

It will thus be observed that the maximum voltage appearing between any of the heaters 25 and 26 and the cathodes 30 is about 140 volts and the minimum voltage so developed, which, of course, depends upon the relative values of the dropping resistors and the number and resistance of the heaters 25 and 26 connected in circuit therewith, may conveniently be selected to be about 40 volts or less so that the maximum voltage which is developed between the heaters and the respective cathodes 30 is a D. C. voltage of less than 90 volts upon which is superimposed an alternating voltage having a peak-to-peak value of approximately 100 volts. Therefore, since the direct voltage component of the voltage appearing between the heaters and the cathodes is less than the 90 volts rated value for receiving type tubes and since the combined direct voltage and superimposed alternating voltage is considerably less than the 200 volt rated value, the lives of the tubes in a receiver incorporating the power supply circuit 10 are not reduced because of the cathode-to-heater voltage developed therein. Also, because two strings of heater filaments are provided with two respective dropping resistors, sufficient current may be provided from a 117 voltage A. C. source to properly heat a large number of filaments in a simple and effective manner whereby the manufacturing cost of power supplies suitable for use in television receivers, radio receivers, and other types of similar equipment is greatly reduced. To summarize, by using a rectifier at one end of the line of heaters and a dropping resistor at the other end of the line of heaters it is possible without utilizing an isolation transformer to supply sufficient heating current to the heaters while maintaining the cathode-to-heater voltage at substantially less than the rated value even when the circuit is utilized in connection with a voltage doubler.

In order to permit the connection of all of the heater filaments in a television receiver or similar type multitube device in a single string, the heater circuit 12 of Fig. 1 may be modified to conform to the heater circuit 35 which is incorporated in the power supply circuit 33 shown in Fig. 2. In the power supply circuit 33, the voltage doubler circuit and associated filter are identical with the voltage doubler 11 in Fig. 1, and, consequently, for purposes of clarity, similar parts are designated by like numerals.

The heater circuit 35 consists of a single dropping resistor 36 connected to the supply line 13 and a single rectifier 37 connected to the other supply line 14. Interconnected between the dropping resistor 36 and the device 37 is a series string 39 of all of the heaters employed in the receiver incorporating the power supply 33. As previously indicated in connection with the power supply 10 of Fig. 1, because of the half-wave rectification action of the device 37, where a large number of tubes are used the simple resistance rectifier type heater supply circuit 12 is ineffective to provide the required voltage across each of the heaters to establish the necessary heating current therein. In order to permit the connection of a large number of heaters 39 in a single string, a capacitor 40 having an appreciable capacitance value of the order of 100 microfarads is connected across the heaters 39.

An understanding of the operation of the heater supply circuit 35 may best be had from a reference to Fig. 5 wherein the curve 43 is indicative of the waveform of voltage appearing at that one of the heaters in the string 39 which is connected to the dropping resistor 36.

During that half of the cycle of the alternating voltage source when the conductor 13 is positive with respect to the conductor 14 current flows in the heater circuit 35 and charges the capacitor 40 through the dropping resistor 36 and the rectifier 37. During the succeeding half-cycle when the conductor 14 is positive with respect to the conductor 13 and no current flows through the device 37, the capacitor 40 discharges through the filaments 39, thereby to establish a sufficiently high effective current to maintain the heaters at the required temperature. The voltage waveform 43 has a maximum value of approximately 115 volts and a minimum value of approximately 30 volts negative, which occurs during the negative half-cycle when the capacitor 40 is discharging through the heaters 39 and the A. C. supply is isolated from the heaters 39 by means of the rectifier 37. In a reduction to practice of the circuit of Fig. 2, the average or D. C. voltage which was established between the heaters 39 and the cathodes 30 was approximately 40 to 50 volts, but as explained in connection with the circuit of Fig. 1, the actual voltage in any case depends, of course, upon the circuit constants chosen. Although the heater circuit 35 provides a lower cathode-to-heater operating voltage than does the filament supply circuit 12, the capacitor 40 must generally be of the electrolytic type because of the relatively high capacitance value needed, and, therefore, the circuit of Fig. 2 is somewhat more expensive to manufacture than that of Fig. 1.

To further reduce the cathode-to-heater voltage developed in a voltage doubler type power supply, the heater supply circuit 44 of Fig. 3 may be employed wherein the capacitor 40 is connected outside of the dropping resistor 36 rather than inside as illustrated in Fig. 2. By connecting the capacitor 40 outside of the resistor 36 there is developed at the first of the heaters 39 the voltage waveform 45 which is shown in Fig. 6. Because during that half-cycle when the conductor 14 is positive with respect to the conductor 13 the capacitor 40 discharges through the dropping resistor 36, the average voltage which is developed at the first heater 39 is considerably lower than that developed in the circuit of Fig. 2, being approximately 9 volts D. C. The circuit arrangement of Fig. 3, however, while reducing the average heater-to-cathode voltage to an almost negligible value is somewhat more expensive to manufacture on a commercial basis than the circuit of Fig. 2 since it is necessary more accurately to control the tolerance of the capacitor 40 to maintain the value thereof at the necessary value. Nevertheless, where it is desired to minimize the cathode-to-heater voltage, the connection of the capacitor outside of the dropping resistor 36 may be employed.

It will thus be seen that the various embodiments of the present invention provide a simple and, consequently, inexpensive heater filament supply circuit for connection directly across the A. C. supply line and, consequently, directly across the input to a full wave voltage doubler circuit without the development of an excessively high cathode-to-heater voltage whereby the manufacturing cost of television receivers and other multi-tube types of electronic equipment is appreciably reduced.

While there has been described what are at present considered to be preferred embodiments of the invention it will be understood that various modifications may be made therein which are within the true spirit and scope of the invention as defined in the appended claims.

What is claimed as new and is desired to be secured by Letters Patent of the United States is:

1. In a power supply of the type adapted to derive from an A. C. voltage both a high direct B+ voltage and current for the heaters of a plurality of discharge devices, the combination of a resistor having first and second points thereon, a rectifier having first and second points thereon separated by a unidirectional impedance element so poled as to conduct current from said first to said second point thereon, a plurality of said heaters connected between said first point on said resistor and said first point on said rectifier, and means adapted to provide an A. C. voltage between said second point on said rectifier and said second point on said resistor.

2. In an electric circuit, the combination of a plurality of discharge devices each having at least one element for producing heat in response to current flowing therein, a resistance means, a unidirectional impedance means, means for connecting a plurality of said elements in circuit between said first and said second named means, said unidirectional impedance means being so poled as to conduct current away from said elements and means adapted to connect a source of alternating electric energy across the circuit which includes said resistance means, said impedance means and said plurality of elements.

3. A power supply circuit for use in electronic equipment employing a plurality of discharge devices each having a cathode and associated heater, comprising a full-wave voltage doubler circuit adapted to be energized from a source of alternating voltage, a heater supply circuit adapted to be energized from across said source, said heater supply circuit including a dropping resistor, a rectifier, a plurality of said heaters interconnected between said rectifier and said resistor, said rectifier being poled so as to conduct current away from said heaters, and a capacitor connected across said heaters.

4. A power supply circuit for use in electronic equipment employing a plurality of discharge devices each having a cathode and associated heater, comprising a full wave voltage doubler circuit adapted to be energized from a source of alternating voltage, a heater supply circuit adapted to be energized from across said source, said heater supply circuit including a dropping resistor, a rectifier, and a plurality of said heaters interconnected between said rectifier and said resistor, said rectifier being poled so as to conduct current away from said heaters, and a capacitor connected in shunt across said heaters and said resistor.

5. In a television receiver, the combination of means energized from an A. C. source and including at least two capacitors for providing a direct voltage between two points, means adapted to connect a cathode of a discharge device to one of said points, means for connecting a heater of said discharge device across said source, and means including a rectifier and a resistor for isolating said heater from said points, whereby the voltage developed between said filament and said cathode is maintained at a relatively low value.

6. The combination of means energized from an A. C. source and including at least two serially connected capacitors for providing a direct voltage between two points, means adapted to connect the cathodes of a plurality of discharge devices to one of said points, means for connecting the junction of said capacitors directly to said source, means for connecting the heaters of said discharge devices across said source, and means including a rectifier and a resistor for isolating said heaters from said other of said points so that the cathode-to-heater voltage is maintained at a relatively low value.

7. In a television receiver, a heater filament supply circuit comprising first and second strings of series-connected heater filaments, dropping resistors connected to the ends of said strings, unidirectional impedance devices connected to the other ends of said strings and so poled as to conduct current away from said filaments, and means to connect a source of alternating voltage across said circuits, each of which include one string of filaments and the associated dropping resistor and unidirectional impedance device.

References Cited in the file of this patent
UNITED STATES PATENTS

| | | |
|---|---|---|
| 2,563,740 | Parker | Aug. 7, 1951 |
| 2,658,140 | Koch | Nov. 3, 1953 |